United States Patent

Davis, Jr.

[11] Patent Number: 5,368,872
[45] Date of Patent: Nov. 29, 1994

[54] PRESSURE AND VACUUM SMOKER APPARATUS AND METHOD

[76] Inventor: Don M. Davis, Jr., P.O. Box 180998, Austin, Tex. 78718

[21] Appl. No.: 114,456

[22] Filed: Aug. 31, 1993

[51] Int. Cl.⁵ .......................... A23L 1/31; A23B 4/044
[52] U.S. Cl. .................... 426/281; 426/314; 426/315; 99/472; 99/482; 99/473
[58] Field of Search .............. 426/314, 315, 281; 99/352, 366, 467, 472, 473, 481, 482, 484, 474, 483, 484

[56] References Cited

U.S. PATENT DOCUMENTS

| | | | |
|---|---|---|---|
| 1,965,960 | 7/1934 | Laubham | 99/482 X |
| 2,064,678 | 12/1936 | Morgan | 99/472 X |
| 2,984,171 | 5/1961 | Lee, Jr. | 99/482 X |
| 3,643,587 | 2/1972 | Harrington et al. | 99/261 |
| 3,776,127 | 12/1973 | Muse | 99/482 |
| 3,969,996 | 7/1976 | Huong et al. | 426/314 X |
| 4,130,052 | 12/1978 | Jacobson | 99/339 |
| 4,348,948 | 9/1982 | Allison | 99/482 |
| 4,467,709 | 8/1984 | Ansdedt | 99/482 |
| 4,469,020 | 9/1984 | Hamilton et al. | 99/352 |
| 4,498,378 | 2/1985 | Norrie et al. | 99/472 |
| 4,686,896 | 8/1987 | Gordon | 99/482 |
| 4,810,510 | 3/1989 | Lever et al. | 99/482 X |
| 4,902,522 | 2/1990 | Rudibaugh | 99/472 X |
| 5,168,797 | 12/1992 | Wang | 99/342 |
| 5,281,428 | 1/1994 | Morgan | 99/472 X |
| 5,318,792 | 6/1994 | Tippimann | 426/510 |

FOREIGN PATENT DOCUMENTS

8402824  7/1984  WIPO .................... 426/314

Primary Examiner—Donald E. Czaja
Assistant Examiner—Milton I. Cano

[57] ABSTRACT

A combination pressure and vacuum smoker is described that includes separate compartments for the creation of a fire, the pressurized smoking of foods, and the smoking of foods in a partial vacuum. In operation, a user creates a fire in the fire compartment and places the foods to be smoked in the other compartments. The unique design to the device allows a user to pressurize the fire compartment with air and to transfer the pressurized and smoke filled air to the pressure smoking compartment to smoke the foods therein contained under pressure. The design further allows a user to create a partial vacuum within the vacuum smoking compartment, to then draw smoke filled air from the fire compartment into the vacuum smoking compartment, and to maintain a partial vacuum in the vacuum smoking compartment. Such a design allows the user to regulate the temperature, smoke concentration, and pressure within the pressure and vacuum smoking compartments using only the fire contained in the fire box as a source of smoke and heat. The present invention also includes a method for the pressurized and vacuum smoking of foods.

12 Claims, 4 Drawing Sheets

PRESSURE AND VACUUM SMOKER APPARATUS AND METHOD

BACKGROUND OF THE INVENTION

This invention relates to an apparatus and method for the smoking of food. More particularly, this invention relates to a smoker that is capable of smoking food either under pressure or in a partial vacuum.

For many years it has been found advantageous to smoke meats and other foods to preserve the foods and to impart a smoke flavor to the foods to enhance the flavor of the foods. Demand for smoked foods, particularly meats, has been great for many years and continues to be great. Therefore, there has been a continual need for a device that facilitates the smoking of such foods and that performs the smoking in an efficient and satisfactory manner.

Historically, foods, particularly meats, have been smoked at atmospheric pressures over long periods of time. Such smoking also served to cook the meat while imparting the smoke flavor. It was later found that the time required to adequately smoke and cook the meats could be reduced if the smoking and cooking processes could be performed in combination and under pressure. It was also found that smoking and cooking meat under pressure imparted more smoke flavor to the meat, tended to cause the meat to retain additional moisture, and caused the meat to be more tender as compared to meat smoked at atmospheric pressure.

In addition to smoking foods under pressure, it has been found that smoking and cooking foods at a pressure less than the surrounding atmospheric pressure draws moisture from the foods and helps to more quickly preserve the foods. For example, meat jerky smoked at less than atmospheric pressure cures more quickly and with a more desirable texture than does meat jerky smoked at atmospheric pressure. Heretofore, no devices have provided for the smoking of foods at a pressure less than atmospheric pressure.

Prior devices have performed the smoking and cooking processes simultaneously and under pressure with some success. U.S. Pat. No. 4,130,052 to Jacobson disclosed a pressurizable smoking enclosure which contained a combination smoke producing and heating element. Meat or other foods were placed within the enclosure and the enclosure was sealed to become airtight. Then, wood blocks or chips were placed upon the heating element and the heating element was then activated. Resultantly, the element heated the enclosure, caused the pressure within the enclosure to increase, and caused the wood contacting the element to smoke. Smoke filled the vessel thereby permeating the food contained within the enclosure and cooking the food contained within the enclosure. The Jacobson device, however, had a major shortcoming. The temperature within the enclosure, the pressure within the enclosure, and the smoke concentration within the enclosure all depended upon the thermal output of the heating element. Resultantly, only one of the three parameters within the enclosure could be controlled at any given time by controlling the heating element. The other two parameters therefore were not simultaneously controllable. Because of this, the cooking environment within the enclosure could not be satisfactorily controlled.

U.S. Pat. No. 4,469,020 to Hamilton et al. disclosed a pressure smoker and cooker which overcame some limitations of the Jacobson device. The Hamilton et al. device included separate control of the temperature, pressure, and smoke concentration within the enclosure. A smoke generator external to the enclosure created smoke that was then pumped into the enclosure thereby filling the enclosure with smoke and pressurizing the enclosure. A pressure relief valve was employed to control the pressure within the enclosure and a flame was then ignited within a heat tube that passed through the pressurized enclosure. The flame could be controlled to regulate the temperature within the enclosure without varying the smoke concentration within the enclosure. Thus, the Hamilton et al. device allowed for separate control of the temperature, pressure, and smoke concentration within the enclosure.

Even though the Hamilton et al. device provided for separate controls, it suffered a shortcoming in its smoke delivery system. A first smoke delivery system described in Hamilton et al. (FIG. 2) required that a compressor receive smoke filled air from a fire box, compress the smoke filled air, and deliver it to the enclosure. Over a relatively short period of time, the particles in the smoke filled air contaminated the compressor and caused the compressor to fail. A second smoke delivery system (FIG. 4) required that the smoke be filtered prior to its passage through the compressor. This system partially protected the compressor, but it also removed the smoke from the air before it was delivered to the enclosure thereby defeating the function of the smoke delivery system. A third smoke delivery system (FIG. 5) employed a venturi effect to draw smoke from the fire box into the enclosure. Such a system was inefficient and delivered little smoke to the enclosure. Therefore, even though the Hamilton et al. device provided for separate control of the temperature, pressure, and smoke concentrations within the enclosure, the smoke delivery system was either ineffective at delivering smoke or resulted and failure of the compressor due to smoke contamination.

Thus, there is a need in the art for a smoker that cooks or cures foods at less than atmospheric pressure. Further, there is a need in the art for a device that also smokes foods under pressure with separate controls for temperature, pressure, and smoke concentration within the smoking enclosure and that delivers smoke in a manner that does not destroy device components.

SUMMARY OF THE INVENTION

It is therefore a general object of the invention to overcome the above described limitations and others of the prior food smoking devices. More particularly, it is an object of the invention to provide an apparatus and a method for the pressurized smoking of food that operates satisfactorily and without the destruction of device components. It is further an object of the present invention to provide an apparatus and method for the smoking of food at a pressure less than atmospheric pressure.

To accomplish these objects, a combination pressure and vacuum smoker preferably comprises a fire compartment, a pressure smoking compartment, a vacuum smoking compartment, fire compartment pressurization means, pressurized smoke transfer means, vacuum creation means, and vacuum smoke transfer means. The components of the apparatus of the present invention operate to provide pressurized smoke within the pressure smoking compartment and to provide smoke at less than atmospheric pressure within the vacuum smoking compartment, the components working together to facilitate the pressurized and vacuum smoking of food.

Preferably, the fire compartment includes an interior adapted to contain a fire, has a pressure sealable opening adapted to provide access to the interior, and is capable of being sealed to become airtight. The pressure smoking compartment has an interior adapted to contain food to be smoked, includes a pressure sealable opening adapted to provide access to the interior the pressure smoking compartment, and is capable of being sealed to become airtight. Further, the vacuum smoking compartment includes an interior adapted to contain food to be smoked and a pressure sealable opening adapted to provide access to the interior, the vacuum smoking compartment capable of being sealed to become airtight.

In operation, food is placed within the pressure and vacuum smoking compartments, the compartments are sealed to become airtight, and a fire is constructed in the fire compartment. Once the fire reaches a desired level, the fire compartment is sealed to become airtight against the atmosphere and then the fire compartment pressurization means operates to controllably pressurize the interior of the fire compartment. The pressurized smoke transfer means then operates to controllably transfer pressurized smoke filled air from the interior of the fire compartment to the interior of the pressure smoking compartment until the smoking compartment becomes filled with pressurized smoke. Once the process is complete, the pressure smoking compartment is sealed and the fire compartment is reopened to the atmosphere so that the fire continues to burn and produce heat. The process preferably repeats over time so that new smoke frequently refills the pressure smoking compartment.

To create an atmosphere of smoke within the vacuum smoking compartment at a pressure somewhat less than atmospheric pressure, the vacuum creation means removes air from the interior of the vacuum smoking compartment to create a partial vacuum within its interior. Then, vacuum smoke transfer means controllably transfers smoke filled air from the interior of the fire compartment to the interior of the vacuum smoking compartment. Once the vacuum smoking compartment becomes filled with smoke filled air, the vacuum smoke transfer means is disabled and the vacuum creation means further reduces the pressure within the vacuum smoking compartment to a desired level. This process also is frequently repeated so that new smoke frequently refills the vacuum smoking compartment.

Preferably, the fire compartment is in direct thermal communication with the pressure and vacuum smoking compartments so that the temperature within the compartments may be regulated by regulating the fire. Therefore, the temperatures, pressures, and smoke concentrations within the pressure and vacuum compartments may each be controlled with the use of a single source of heat and smoke—the fire in the fire compartment. This ability is preferable to that provided by the prior devices. Those who smoke meats find it desirable to burn wood to produce the heat and smoke required to smoke foods without requiring other sources of heat and smoke. Neither the Hamilton nor the Davis device provided such a capability.

The present apparatus for supplying pressurized smoke overcomes a limitation of the Hamilton device. The Hamilton device was either ineffective in delivering pressurized smoke or caused the component compressor to fail over time because smoke filled air was passed through the compressor. The present invention, however, provides compressed air to the fire compartment and in turn transfers pressurized smoke filled air to the pressure smoking compartment. The present invention therefore, advantageously provides any desired level of pressurized smoke without destroying any system components.

The present invention further provides for the smoking of foods within a smoke filled environment at a pressure less than atmospheric pressure. Such a capability results in the expedited removal of moisture from the foods that is not possible with smoking the foods at atmospheric pressure. No prior devices have provided this important advantage.

These and other objects, advantages, and features of the invention will be apparent from the following description of the preferred embodiments, considered along with the accompanying drawings.

DESCRIPTION OF THE PREFERRED EMBODIMENTS

Figure 1:
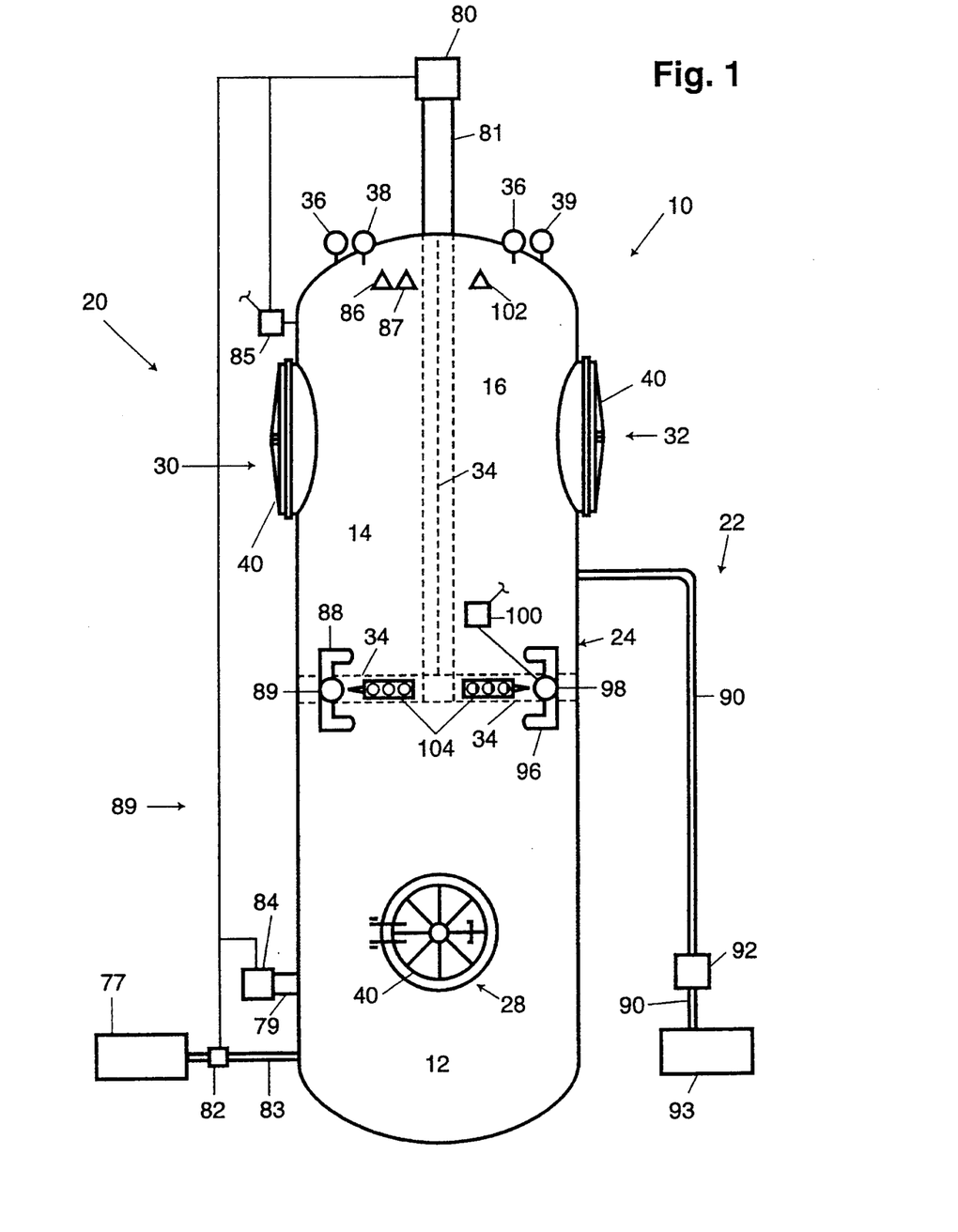
FIG. 1 is a front elevational view of a preferred embodiment of the apparatus of the present invention.

A combination pressure and vacuum smoker 10 embodying the principles of the present invention is shown by way of illustration in FIGS. 1 through 5. Referring to FIG. 1, the combination pressure and vacuum smoker 10 preferably comprises a fire compartment 12, a pressure smoking compartment 14, and a vacuum smoking compartment 16. Operative in conjunction with the pressure smoking compartment 14, the combination smoker 10 further comprises fire compartment pressurization means 18 and pressurized smoke transfer means 20. Further, operative in conjunction with the vacuum smoking compartment 16, the combination smoker 10 also comprises vacuum creation means 22 and vacuum smoke transfer means 24.

The fire compartment 12, pressure smoking compartment 14, and vacuum smoking compartment 16 preferably share an outer shell 26 formed of metal. The fire compartment 12 includes an interior adapted to contain a fire, has a pressure sealable opening 28 adapted to provide access to the interior, and is capable of being sealed against the atmosphere and the other compartments to become airtight. The pressure smoking compartment 14 includes an interior adapted to contain food to be smoked, includes a pressure sealable opening 30 adapted to provide access to the interior of the pressure smoking compartment, and is capable of being sealed against the atmosphere and the other compartments to become airtight. Further, the vacuum smoking compartment 16 includes an interior adapted to contain food to be smoked, a pressure sealable opening 32 adapted to provide access to the interior, and is capable of being sealed against the atmosphere to become airtight.

Racks, as are known in the art but not shown, are contained within the pressure and vacuum smoking compartments 14 and 16 to support food which is placed in the compartments. Further, a rack (not shown) is also contained within the fire compartment 12 to support combustible material, such as wood, within the compartment. Airtight partitions 34 (as shown by the dotted lines) are sealingly attached to the inner walls of the outer shell 26 to create the separate compartments 12, 14, and 16 within the outer shell. The partitions 34 are preferably formed of metal and welded to the inner walls of the outer shell 26 so that air may not flow past the partitions within the outer shell from one compartment to another compartment. However, because the pressure smoking compartment 14 and the vacuum smoking compartment 16 each share partitions 34 with the fire compartment 12, heat may pass from the fire compartment through the partitions 34 to both the pressure smoking compartment and the vacuum smoking compartment. Thus, a user of the smoker 10 may control the temperature within the pressure and vacuum smoking compartments 14 and 16 by regulating the size of the fire contained within the fire compartment 12. Temperature gauges 36, a pressure gauge 38, and a vacuum gauge 39 provide the user with information on the temperature and pressure within the pressure and vacuum smoking compartments 14 and 16.

Figure 2:
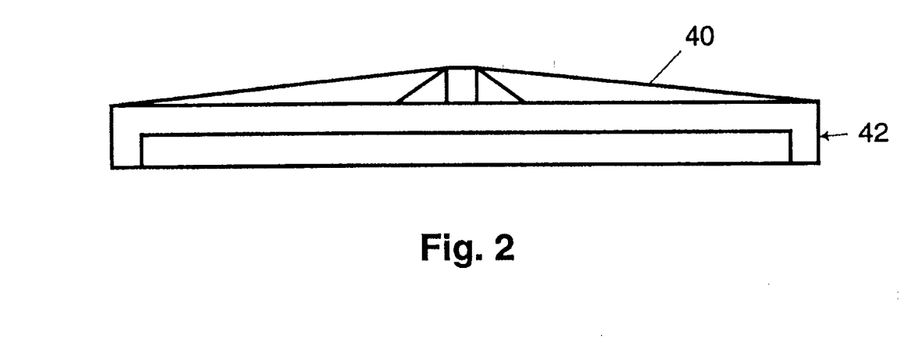
FIG. 2 is a transverse sectional view of a door used to cover and seal a compartment opening.

The pressure sealable openings 28, 30, and 32 are preferably identical in size so that pressure sealable doors 40 may be constructed interchangeably. Preferably, the pressure sealable doors 40, as shown in FIG. 2, are round and are constructed of a metal that is of sufficient strength to withstand pressure differentials across their surfaces. A lip 42 is formed that extends normally from the inner surface of the doors 40 about the circumference of the doors.

Figure 3:
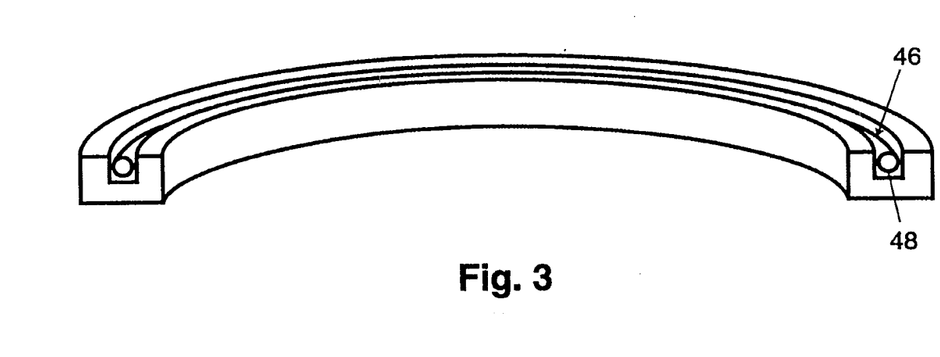
FIG. 3 is a transverse sectional view of a door receiving structure designed to receive the door shown in FIG. 2.

FIG. 3 shows a door receiving structure 44, one of these door receiving structures being firmly and sealingly attached to each of the openings 28, 30, and 32 in the outer shell 26. Preferably, the door receiving structures 44 are formed of a rigid metal and are welded to the outer shell 26 to provide an air-tight seal. Formed within the color receiving structures 44 are door receiving channels 46 for receiving the lips 42 formed in the pressure sealable doors 40. Contained within these door receiving channels are gaskets 48 preferably formed of a temperature resistant material such as VITON or TEFLON. These gaskets 48 assist in creating an air-tight seal between the doors 40 and the door receiving structures 44.

Figure 4:
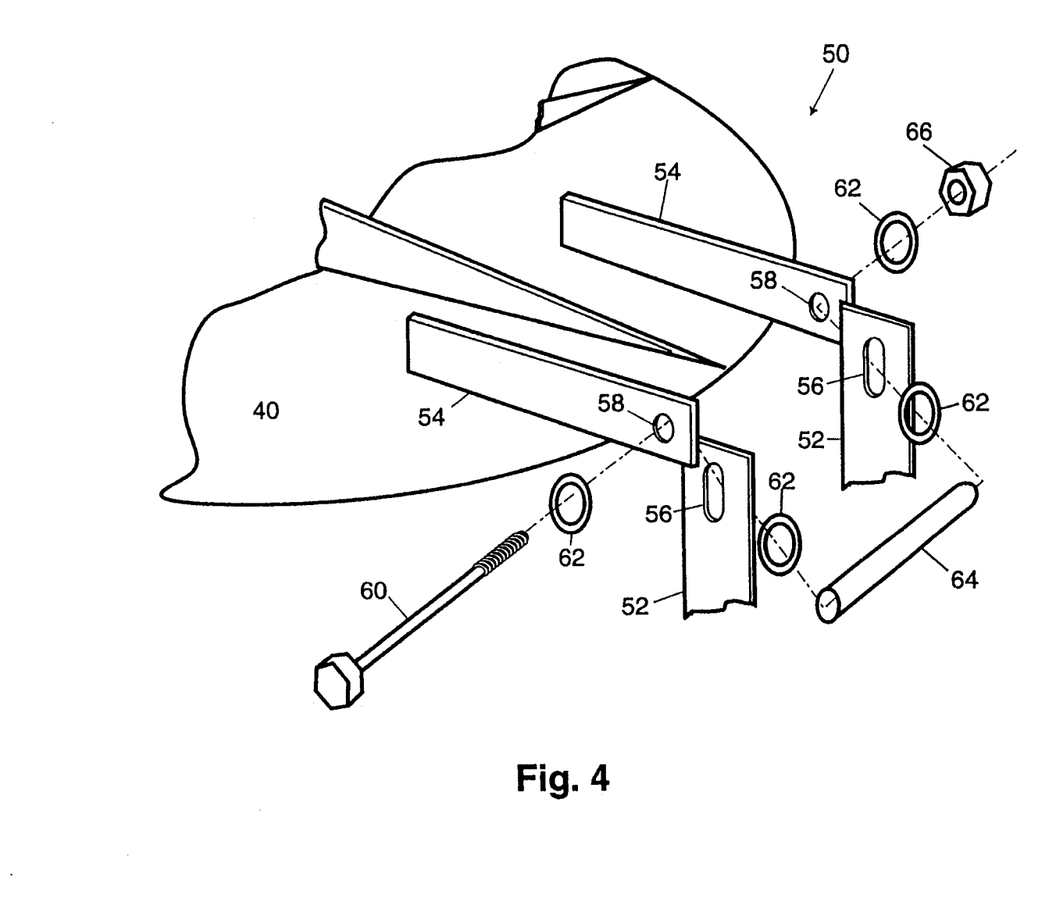
FIG. 4 is a detail view mostly in perspective and partially broken away of a hinge used to connect the door shown in FIG. 2 to the door receiving structure shown in FIG. 3.

FIG. 4 shows a hinge structure 50 used to attach the pressure sealable door 40 to the door receiving structure 44. Because each of the pressure sealable doors 40 must be opened to allow access to the compartments 12, 14, and 16, the hinge structures 50 must allow the user to disengage and move the door away from the door receiving structure 44 while supporting the weight of the pressure sealable door 40. Further, the hinge structure 50 must allow the pressure sealable door 40 to engage and disengage the door receiving structures 44 so that the door lips 42 fit within the door receiving channels 46. Therefore, the hinge must allow the pressure sealable doors 40 to move perpendicularly with respect to the door receiving structure 44 for a limited distance.

As shown in FIG. 4, the hinge structure 50 includes door receiving supports 52 that attach firmly to the door receiving structures 44 and door connecting supports 54 that attach firmly to the doors 40. Elongated openings 56 in the door receiving supports 52 and circular openings 58 in the door connecting supports 54 work in conjunction with a bolt 60, washers 62, a spacer 64, and a nut 66 to allow the door 40 to pivot away from the door receiving structure 44. Further, the elongated openings 56 allow the door 40 to have limited motion perpendicular to the door receiving structure 44 so that the lip 42 on the door may slide within the door receiving channel 46.

Figure 5:
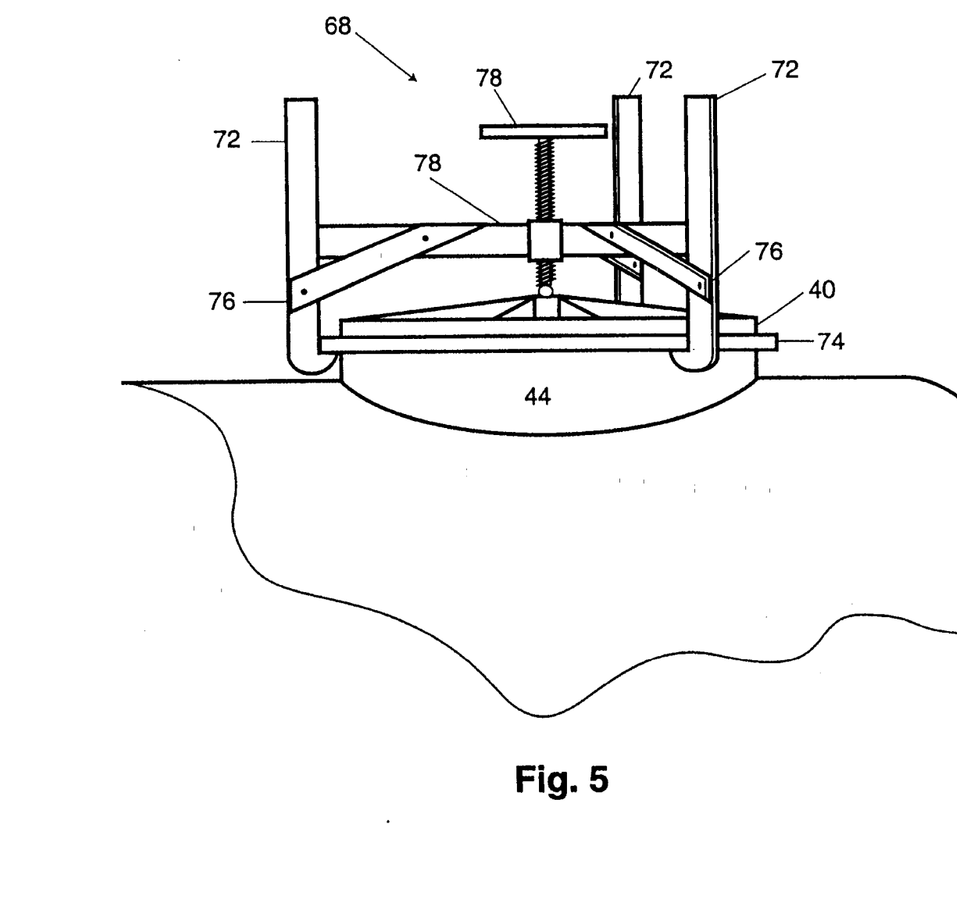
FIG. 5 is a mostly diagrammatic elevational view of a door compression device used to seal the door shown in FIG. 2 to the door receiving structure shown in FIG. 3.

FIG. 5 shows a door compression device 68 which, when engaged, causes the door 40 to firmly engage the door receiving structure 44 to form an air-tight seal. The door compression device 68 includes a central structure 70 and preferably three engaging arms 72 which engage an outer ridge 74 formed in the door receiving structure 44. Connection members 76 pivotally connect the engaging arms 72 to the central structure 70 so that the engaging arms may either be positioned to engage the outer ridge 74 or to swing away from the door receiving structure 44 so that the door compression device 68 may be removed. A pressure applicator 78 is screwingly mounted to the central structure 70 such that it may be rotated to either apply to or release pressure from the pressure sealable door 40. When engaged, the pressure applicator 78, working in conjunction with the central structure 70 and the engaging arms 72, forces the door lip 42 down into the door receiving channel 46 to form an air-tight seal between the pressure sealable door 40 and the door receiving structure 44. When the pressure applicator 78 is released, the door compression device 68 may be removed and the pressure sealable door 40 may be opened.

Referring again to FIG. 1, the fire compartment pressurization means 18 is for controllably pressurizing the interior of the fire compartment 12. Preferably, the fire compartment pressurization means 18 includes a normally open valve 80 that mounts upon a chimney 81 that extends from the fire compartment 12 through the pressure smoking compartment 14 and the vacuum smoking compartment 16. Positioned in this manner, the chimney 81 delivers heat to the pressure smoking compartment 14 and the vacuum smoking compartment 16. The fire compartment pressurization means 18 further comprises a normally closed valve 82 connected between a source of pressurized air 77 and a pipe 83 which connects to the fire compartment 12, a normally open valve 84 connected to allow air to flow into the fire compartment via a pipe 79, and a pressure switch 85. The fire compartment pressurization means 18 still further comprises a pressure relief valve 86 that selectively allows air to flow from the pressure smoking compartment 14 and a pressure pop-off 87 that allows air to flow from the pressure smoking compartment 14 when the pressure within the compartment becomes too great.

The pressurized smoke transfer means 20 is for controllably transferring pressurized smoke filled air from the interior of the fire compartment 12 to the interior of the pressure smoking compartment 14. Preferably, the pressurized smoke transfer means 20 includes a pipe 88 and a check valve 89. The pipe 88 is sealably attached to the outer shell 26 to provide an air passage between the fire compartment 12 and the pressure smoking compartment 14. The check valve 89 is attached within a central portion of the pipe 88 arid allows smoke filled air to pass in one direction from the fire compartment 12 to the pressure smoking compartment 14 but not in the opposite direction.

Still referring to FIG. 1, the vacuum creation means 22 is for removing air from the interior of the vacuum smoking compartment 16 to create a partial vacuum within the interior of the vacuum smoking compartment. Preferably, the vacuum creation means 22 includes piping 90, an air filter 92 and a vacuum pump 93 with all of the components being sealingly attached. Preferably, the vacuum creation means 22 continually operates to remove air from the vacuum smoking compartment 16.

The vacuum smoke transfer means 24 is for controllably transferring smoke filled air from the interior of the fire compartment 12 to the interior of the vacuum smoking compartment 16. Preferably, the vacuum smoke transfer means 24 includes a pipe 96, a normally closed valve 98, and a vacuum switch 100. The pipe 96 is sealingly attached to the outer shell 26 to provide an airtight passage for smoke filled air to travel from the fire compartment 12 into the vacuum smoking compartment 16. The normally closed valve 98 installed within a central portion of the pipe 96 allows smoke filled air to travel from the fire compartment 12 through the pipe and to the vacuum smoking compartment 14 only when it is activated to an open position. The vacuum switch 100 operates to open the normally closed valve 98 when the pressure within the vacuum smoking compartment 16 goes below a selected level. A vacuum pop-off 102 opens when the pressure within the vacuum smoking compartment 16 becomes low enough to potentially damage the smoker 10.

In operation then, a user of the combination pressure and vacuum smoker 10 first prepares food to be smoked. Then, the user builds a fire in the fire compartment 12 until it grows to a desired heat and smoke level. The user then places the food to be smoked in desired proportions within the pressure and vacuum smoking compartments 14 and 16. The user then closes the pressure sealable doors 40 associated with the pressure 12 and vacuum 14 smoking compartments so that the door lips 42 fit within the door receiving channels 46 of the door receiving structures 44. The user then uses the door compression devices 68 to firmly seal the pressure sealable doors 40 associated with the pressure and vacuum smoking compartments 14 and 16. The user then performs the same procedure with the pressure sealable door 40 associated with the fire compartment 12.

To pressurize the pressure smoking compartment 14, the user activates the fire compartment pressurization means 18 and the pressurized smoke transfer means 20 so that they automatically operate. In operation, then, when the pressure switch 85 senses a low pressure situation in the pressure smoking compartment 12, the pressure switch activates to cause the normally open solenoid valves 80 and 84 to the closed positions and causes the normally closed solenoid valve 82 to the open position. Thus, with valve 82 in the open position, pressurized air enters the pressure smoking compartment 12. Because valves 80 and 84 are closed, pressure builds up in within the fire compartment 12 until the pressure within the fire compartment exceeds the pressure within the pressure smoking compartment 14. At that time, check valve 89 opens and allows smoke filled air to flows from the fire compartment 12, through the pipe 88, and into the pressure smoking compartment 14. When the pressure within the pressure smoking compartment 14 reaches a selected level, pressure switch 85 deactivates to open valves 80 and 84 and close valve 82. Check valve 89 prevents smoke filled air from flowing from the pressure smoking compartment 14 to the fire compartment 12. Preferably, the pressure relief valve 86 operates in a partially open position to allow smoke to slowly escape from the pressure smoking compartment 14. Thus, the process of pressurizing the pressure smoking compartment 14 periodically repeats to introduce smoke filled air into the pressure smoking compartment.

To create a smoke filled partial vacuum within the vacuum smoking compartment 16, the vacuum pump 93 continually operates to remove air from the vacuum smoking compartment 16. To prevent damage to the vacuum pump 93, the filter 92 also continually filters smoke from the air being removed from the vacuum smoking compartment 16. When the pressure within the vacuum smoking compartment 16 drops below a selected level, the vacuum switch 100 activates to open the normally closed valve 98, thus allowing smoke filled air to pass from the fire compartment 12 through the pipe 96 and into the vacuum smoking compartment 16. When the pressure within the vacuum smoking compartment 16 rises above a selected level, the vacuum switch 100 deactivates to close the normally closed valve 98 thus causing the flow of smoke filled air from the fire compartment 12 to the vacuum smoking compartment 16 to stop. This process periodically repeats itself as the vacuum pump 93 continues to draw air from the vacuum smoking compartment 16.

To regulate the heat within the pressure 14 and vacuum 16 smoking compartments, heat regulation vents 104 are operable to regulate the direct flow of heat from the fire box 12 to the pressure and vacuum smoking compartments. In this manner, a user of the device may regulate the heat, pressure, and smoke concentration within the pressure 14 and vacuum 16 smoking compartments with the fire within the fire compartment 12 being the only source of heat and smoke.

When the foods within the combination smoker 10 are finished smoking, the user deactivates the fire compartment pressurization means 18, the pressurized smoke transfer means 20, the vacuum creation means 22, and the vacuum smoke transfer means 24. The user then opens the pressure sealable doors 40 and remove the smoked and cooked food.

The present invention also includes methods for the pressure and vacuum smoking of food. Referring to FIG. 1, a method for smoking food under pressure comprises as a first step containing a fire within a fire compartment 12, the fire compartment having an interior adapted to contain a fire and a pressure sealable opening 28 adapted to provide access to the interior, the fire compartment capable of being sealed to become airtight. A next step comprises containing food within a pressure smoking compartment 14, the pressure smoking compartment having an interior adapted to contain food to be smoked and a pressure sealable opening 30 adapted to provide access to the interior, the pressure smoking compartment capable of being sealed to become airtight. A next step includes controllably pressurizing the interior of the fire compartment 12. And a further step includes controllably transferring pressurized smoke filled air from the interior of the fire compartment 12 to the interior of the smoking compartment 14. The method of the present invention may also include the step of transferring heat from the fire compartment 12 to the pressure smoking compartment 14.

The method of the present invention for smoking food may also include steps for smoking food at less than atmospheric pressure. Such steps include containing the food to be smoked at less than atmospheric pressure in a vacuum smoking compartment 16 having an interior adapted to contain food to be smoked and a pressure sealable opening 30 adapted to provide access to the interior, the vacuum smoking compartment capable of being sealed to become airtight. A next step includes removing air from the interior of the vacuum smoking compartment 16 to create a partial vacuum within the interior of the vacuum smoking compartment. And, a further step includes controllably transferring smoke filled air from the interior of the fire compartment 12 to the interior of the vacuum smoking compartment 16. Here again, the method may include the step of transferring heat from the fire compartment 12 to the vacuum smoking compartment 16. The pressure smoking of food includes as a first step.

The above described preferred embodiments are intended to illustrate the principles of the invention, but not to limit the scope of the invention. Various other embodiments and modifications to these preferred embodiments may be made by those skilled in the art without departing from the scope of the following claims.

I claim:

1. An apparatus for smoking food under pressure, the apparatus comprising:
   (a) a fire compartment having an interior adapted to contain a fire and smoke and a pressure sealable opening adapted to provide access to the interior the fire compartment capable of being sealed to become airtight;
   (b) a pressure smoking compartment having an interior adapted to contain food to be smoked and a pressure sealable opening adapted to provide access to the food in the interior, the pressure smoking compartment capable of being sealed to become airtight;
   (c) fire compartment pressurization means for controllably pressurizing the interior of the fire compartment; and
   (d) pressurized smoke transfer means for controllably transferring pressurized smoke filled air from the interior of the fire compartment to the interior of the pressure smoking compartment.

2. The apparatus of claim 1 wherein the pressure smoking compartment is in direct thermal communication with the fire compartment.

3. The apparatus of claim 1 wherein:
   (a) the fire compartment pressurization means includes a controllable valve for delivering pressurized air to the fire compartment; and (b) the pressurized smoke transfer means includes a controllable valve for controlling the delivering of the pressurized smoke filled air from the fire compartment to the pressure smoking compartment.

4. The apparatus of claim 1 further comprising:
   (a) a vacuum smoking compartment having an interior adapted to contain food to be smoked and a pressure sealable opening adapted to provide access to the food in the interior, the vacuum smoking compartment capable of being sealed to become airtight;
   (b) vacuum creation means for removing air from the interior of the vacuum smoking compartment to create a partial vacuum within the interior of the vacuum smoking compartment; and
   (c) vacuum smoke transfer means for controllably transferring smoke filled air from the interior of the fire compartment to the interior of the vacuum smoking compartment in response to the partial vacuum.

5. The apparatus of claim 1 wherein the vacuum smoking compartment is in direct thermal communication with the fire compartment.

6. The apparatus of claim 4 wherein the vacuum creation means includes:
   (a) a controllable vacuum pump connected to the vacuum smoking compartment; and
   (b) a filter for filtering air prior to its entering the vacuum pump.

7. An apparatus for smoking food at less than atmospheric pressure, the apparatus comprising:
   (a) a fire compartment having an interior adapted to contain a fire and smoke;
   (b) a vacuum smoking compartment having an interior adapted to contain food to be smoked and a pressure sealable opening adapted to provide access to the food in the interior, the vacuum smoking compartment capable of being sealed to become airtight;
   (c) vacuum creation means for removing air from the interior of the vacuum smoking compartment to create a partial vacuum within the interior of the vacuum smoking compartment; and
   (d) vacuum smoke transfer means for controllably transferring smoke filled air from the interior of the fire compartment to the interior of the vacuum smoking compartment in response to the partial vacuum.

8. The apparatus of claim 7 wherein the fire compartment includes a pressure sealable opening adapted to provide access to the interior, the fire compartment is capable of being sealed to become airtight and the apparatus further comprises:
   (a) a pressure smoking compartment having an interior adapted to contain food to be smoked and a pressure sealable opening adapted to provide access to the interior, the pressure smoking compartment capable of being sealed to become airtight;
   (b) fire compartment pressurization means for controllably pressurizing the interior of the fire compartment; and
   (c) pressurized smoke transfer means for controllably transferring pressurized smoke filled air from the interior of the fire compartment to the interior of the smoking compartment.

9. The apparatus of claim 7 wherein the vacuum smoking compartment is in direct thermal communication with the fire compartment.

10. A method for smoking food under pressure, the method comprising the steps of:
    (a) containing a fire within a fire compartment, the fire compartment having an interior adapted to contain a fire and smoke and a pressure sealable opening adapted to provide access to the interior, the fire compartment capable of being sealed to become airtight;
    (b) placing food within a pressure smoking compartment, the pressure smoking compartment having an interior adapted to contain food to be smoked and a pressure sealable opening adapted to provide access to the interior, the pressure smoking compartment capable of being sealed to become airtight;

(c) controllably pressurizing the interior of the fire compartment; and (d) controllably transferring pressurized smoke filled air from the interior of the fire compartment to the interior of the smoking compartment.

11. The method of claim 10 further comprising the step of:

(a) transferring heat from the fire compartment to the smoking compartment.

12. The method of claim 10 further comprising the steps of:

(a) placing food to be smoked at less than atmospheric pressure in a vacuum smoking compartment having an interior adapted to contain food to be smoked and a pressure sealable opening adapted to provide access to the food in the interior, the vacuum smoking compartment capable of being sealed to become airtight;

(b) removing air from the interior of the vacuum smoking compartment to create a partial vacuum within the interior of the vacuum smoking compartment; and (c) controllably transferring smoke filled air from the interior of the fire compartment to the interior of the vacuum smoking compartment in response to the partial vacuum.

* * * * *